(12) United States Patent
Anderson

(10) Patent No.: US 9,586,761 B2
(45) Date of Patent: Mar. 7, 2017

(54) GRAIN DRYING AND MOVING APPARATUS COMBINATION

(71) Applicant: Allan Anderson, Leland, IA (US)

(72) Inventor: Allan Anderson, Leland, IA (US)

( * ) Notice: Subject to any disclaimer, the term of this patent is extended or adjusted under 35 U.S.C. 154(b) by 469 days.

(21) Appl. No.: 14/306,459

(22) Filed: Jun. 17, 2014

(65) Prior Publication Data

US 2014/0290088 A1 Oct. 2, 2014

Related U.S. Application Data

(63) Continuation-in-part of application No. 13/348,621, filed on Jan. 11, 2012, now Pat. No. 8,782,919.

(51) Int. Cl.
*F26B 17/12* (2006.01)
*B65G 19/16* (2006.01)

(52) U.S. Cl.
CPC .............. *B65G 19/16* (2013.01); *F26B 17/12* (2013.01); *F26B 2200/06* (2013.01)

(58) Field of Classification Search
CPC . F26B 17/00; F26B 17/12; A61L 2/00; B65G 19/00; B65G 19/08; B65G 19/16
USPC ......... 34/82, 173; 422/32; 414/326; 198/734
See application file for complete search history.

(56) References Cited

U.S. PATENT DOCUMENTS

| | | |
|---|---|---|
| 3,449,840 A | 6/1969 | Francis |
| 3,704,780 A | 12/1972 | Aidlin et al. |
| 3,789,587 A * | 2/1974 | Moorefield, II ....... B65G 53/60 209/307 |
| 3,913,239 A | 10/1975 | Burgin |
| 4,004,351 A | 1/1977 | Sannerman et al. |
| 4,142,302 A | 3/1979 | Primus |
| 4,177,900 A * | 12/1979 | Kluthe .................... B07B 1/526 209/247 |
| 4,183,430 A | 1/1980 | Hunter |
| 4,217,701 A | 8/1980 | Mathews |
| 4,404,756 A | 9/1983 | Noyes |
| 4,471,868 A | 9/1984 | Buschbom et al. |
| 4,530,167 A | 7/1985 | Hotovy |
| 4,630,382 A | 12/1986 | Keiler et al. |
| 4,732,260 A | 3/1988 | Canziani |
| 4,914,834 A | 4/1990 | Sime |

(Continued)

FOREIGN PATENT DOCUMENTS

| | | | | |
|---|---|---|---|---|
| DE | 1470326 A | * | 4/1977 | ............. A01D 41/04 |
| DE | 3720514 A1 | * | 12/1988 | ............. B65G 69/14 |

(Continued)

*Primary Examiner* — Stephen M Gravini

(57) ABSTRACT

A grain drying and moving apparatus combination includes a conveyor assembly in communication with a bottom wall channel of a grain dryer assembly. The conveyor assembly receives and transports grain away from the housing. The conveyor assembly includes a conduit that is attachable to the bottom wall and coextensive with the channel. The conduit includes a first lateral wall, a second lateral wall and a lower wall. A rail is attached to the conduit. A chain is mounted on the rail and forms a continuous loop. The chain includes a plurality of links each having an upper plate and a lower plate. The upper and lower plates are horizontally orientated. A plurality of paddles is attached to and extends downwardly from the chain. The paddles each extend between the first and second lateral walls when the paddles are within the conduit.

20 Claims, 13 Drawing Sheets

(56) References Cited

U.S. PATENT DOCUMENTS

| | | | |
|---|---|---|---|
| 5,039,827 A | 8/1991 | Harmon | |
| 5,048,671 A | 9/1991 | Ellsworth | |
| 5,449,263 A * | 9/1995 | Campbell | B65G 65/466 414/320 |
| 5,593,019 A | 1/1997 | Schlagel | |
| 5,860,221 A | 1/1999 | Morrison et al. | |
| 6,073,364 A | 6/2000 | McKenzie et al. | |
| 6,073,367 A | 6/2000 | McKenzie et al. | |
| 6,076,276 A | 6/2000 | McKenzie et al. | |
| 6,098,305 A | 8/2000 | Watson et al. | |
| 6,206,073 B1 * | 3/2001 | Lay | A01F 25/2018 160/1 |
| 6,233,843 B1 | 5/2001 | McKenzie et al. | |
| 6,282,809 B1 * | 9/2001 | Sunde | F26B 5/04 34/135 |
| 6,715,274 B2 * | 4/2004 | Peeters | A01D 84/00 56/366 |
| 6,834,442 B1 | 12/2004 | Bloemendal | |
| 7,036,657 B1 | 5/2006 | Robinson | |
| 7,568,297 B2 | 8/2009 | Pierson et al. | |
| 7,908,835 B2 * | 3/2011 | Bertino | A01D 29/00 460/59 |
| 8,045,168 B2 * | 10/2011 | Missotten | A01D 41/127 356/445 |
| 8,240,062 B2 | 8/2012 | Sukup | |
| 8,601,714 B2 | 12/2013 | Morrison et al. | |
| 8,782,919 B1 * | 7/2014 | Anderson | F26B 17/12 198/734 |
| 8,864,433 B2 * | 10/2014 | Hoogestraat | B65G 65/466 198/594 |
| 8,875,412 B1 * | 11/2014 | Anderson | F26B 9/063 165/177 |
| D745,899 S * | 12/2015 | Anderson | D15/28 |
| 2002/0032971 A1 | 3/2002 | Middaugh et al. | |
| 2006/0123655 A1 | 6/2006 | Valfiorani | |
| 2006/0130357 A1 | 6/2006 | Long, Jr. | |
| 2006/0269383 A1 * | 11/2006 | Lepp | B65G 65/466 414/133 |
| 2007/0169370 A1 | 7/2007 | Sukup | |
| 2007/0234587 A1 | 10/2007 | Person et al. | |
| 2008/0178488 A1 | 7/2008 | Shivvers | |
| 2008/0304945 A1 | 12/2008 | Hlinka | |
| 2009/0191091 A1 | 7/2009 | Danchenko et al. | |
| 2010/0229421 A1 | 9/2010 | Salisbury | |
| 2012/0011736 A1 | 1/2012 | Morrison et al. | |
| 2012/0048958 A1 * | 3/2012 | Stevenson | A01C 3/066 239/1 |
| 2014/0290088 A1 * | 10/2014 | Anderson | B65G 19/16 34/201 |

FOREIGN PATENT DOCUMENTS

| | | |
|---|---|---|
| DE | 19905426 A1 | 8/2000 |
| GB | 398628 | 9/1933 |
| JP | 56108633 A | 8/1981 |

* cited by examiner

GRAIN DRYING AND MOVING APPARATUS COMBINATION

This application is a Continuation in Part and I hereby claim the benefit under Title 35, United States Code, Section 120 of U.S. application Ser. No. 13/348,621 filed on Jan. 11, 2012.

BACKGROUND OF THE DISCLOSURE

Field of the Disclosure

The disclosure relates to grain moving devices and more particularly pertains to a new grain moving device for efficiently moving grain outwardly of a grain dryer which includes a centrally located air inlet extending through a bottom wall of the grain dryer.

SUMMARY OF THE DISCLOSURE

An embodiment of the disclosure meets the needs presented above by generally comprising a conveyor assembly that is configured to be in communication with a bottom wall channel of a grain dryer assembly. The conveyor assembly is configured to receive and transport grain away from the housing. The conveyor assembly includes a conduit that is attachable to the bottom wall and is coextensive with the channel. The conduit includes a first lateral wall, a second lateral wall and a lower wall attached to and extending between the first and second lateral walls. A rail is attached to the conduit. A chain is mounted on the rail and forms a continuous loop. The chain includes a plurality of links each having an upper plate and a lower plate. The upper and lower plates are horizontally orientated so that the chain lies in a horizontal plane. A plurality of paddles is attached to and extends downwardly from the chain. The paddles each extend between the first and second lateral walls when the paddles are within the conduit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
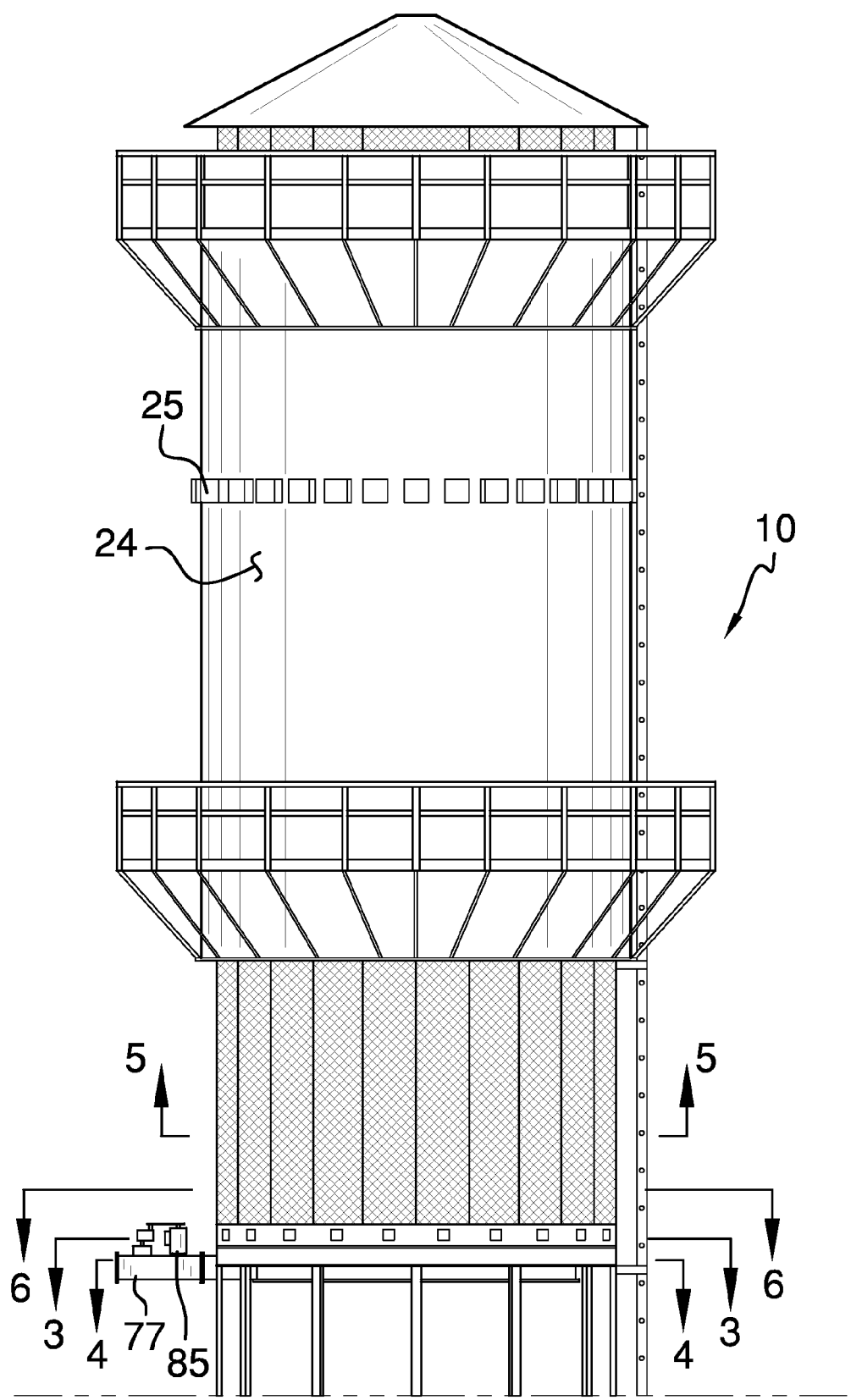
FIG. 1 is a front view of a grain drying apparatus according to an embodiment of the disclosure.
Figure 2:
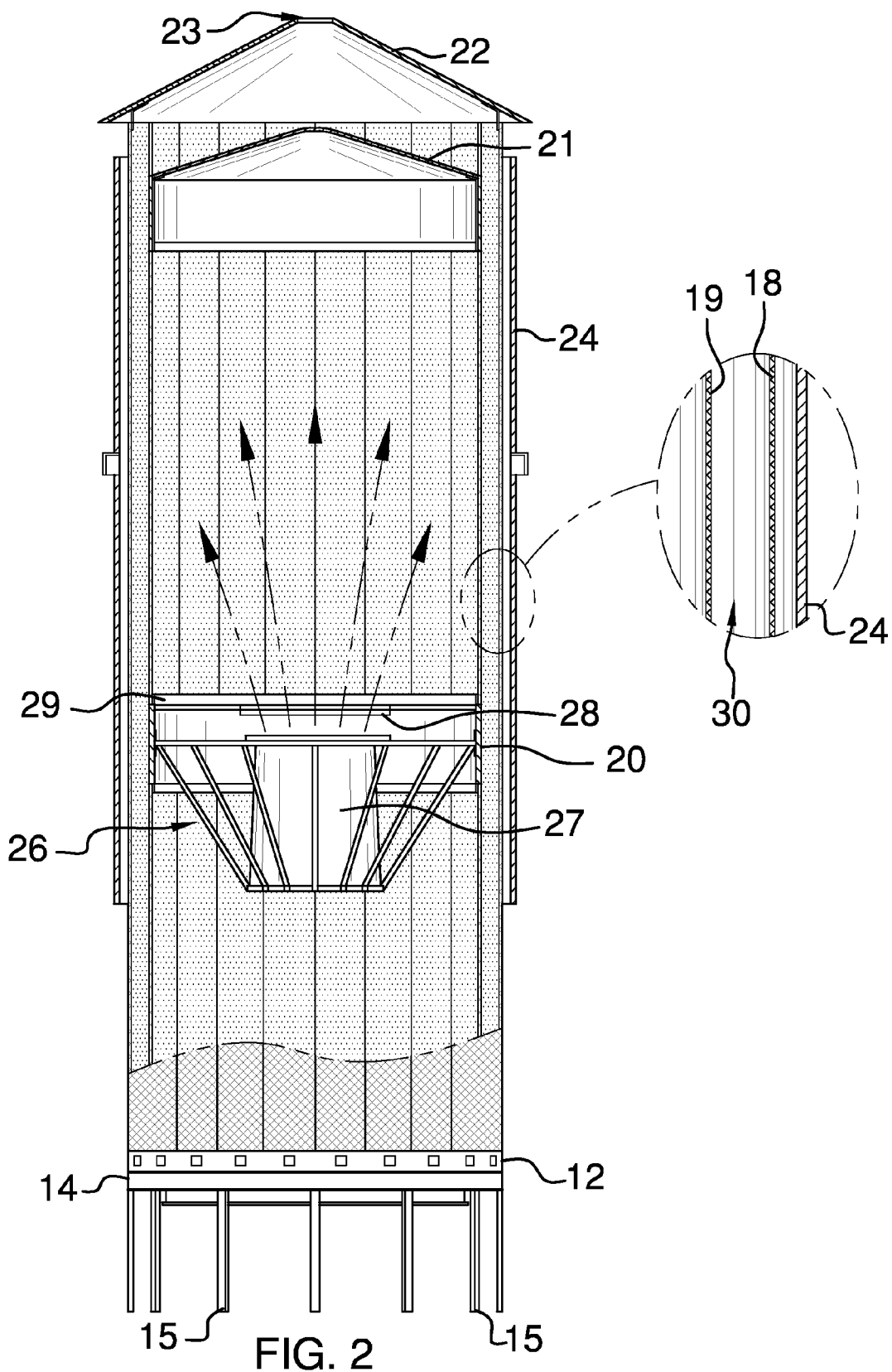
FIG. 2 is a front broken view of an embodiment of the disclosure.
Figure 3:
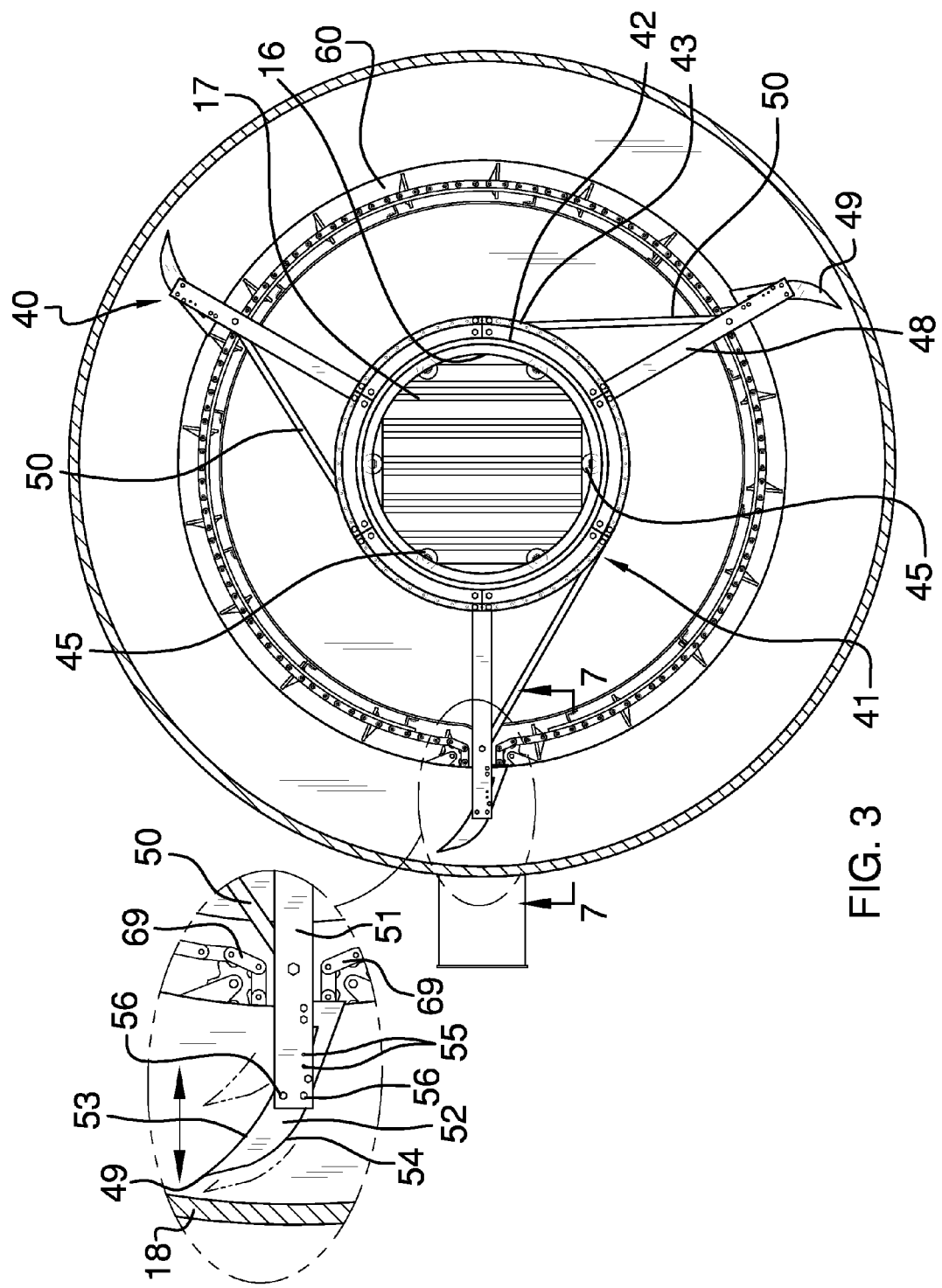
FIG. 3 is a cross-sectional view of an embodiment of the disclosure taken along line 3-3 of FIG. 1.
Figure 4:
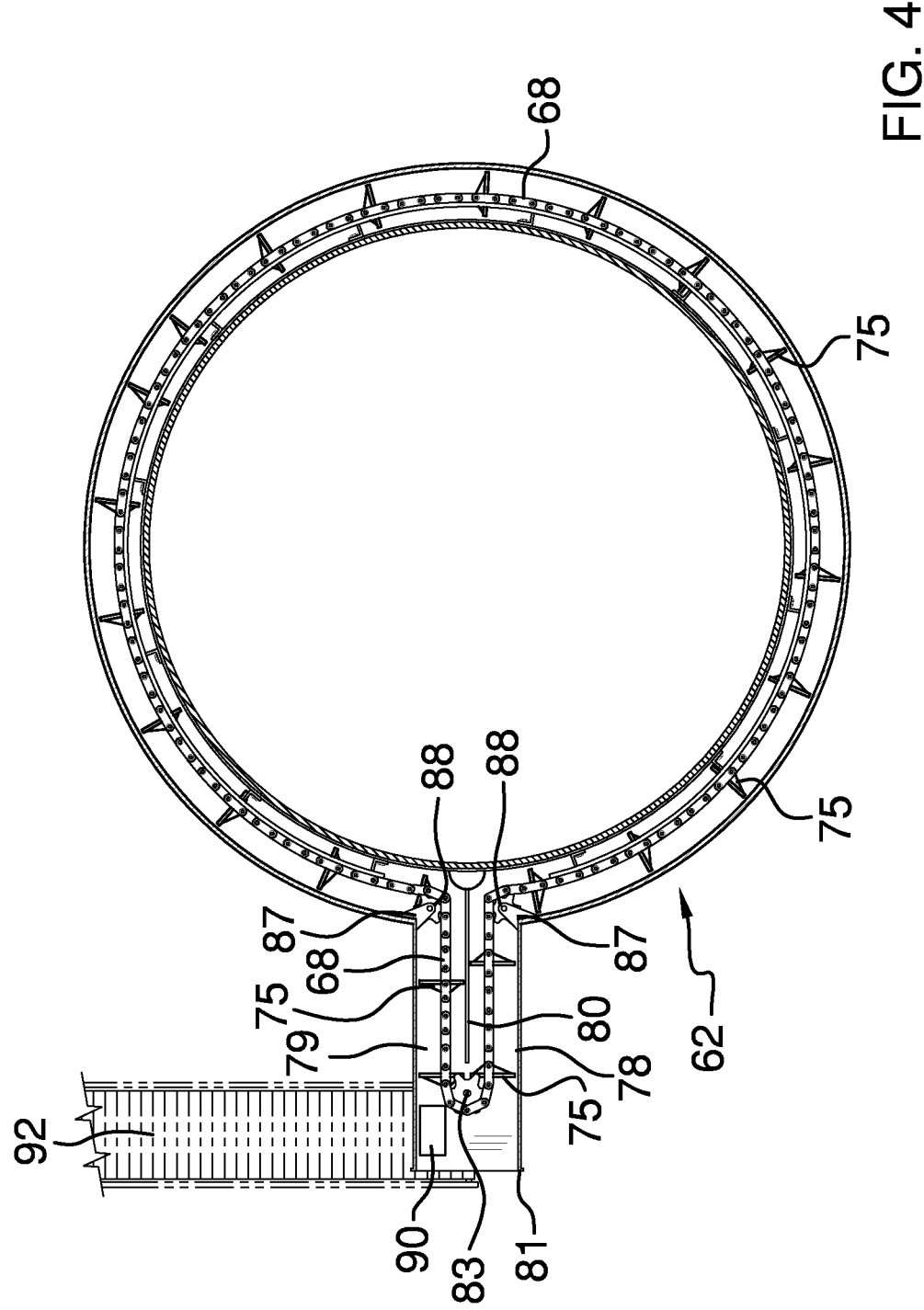
FIG. 4 is a cross-sectional view of an embodiment of the disclosure taken along line 4-4 of FIG. 1.
Figure 5:
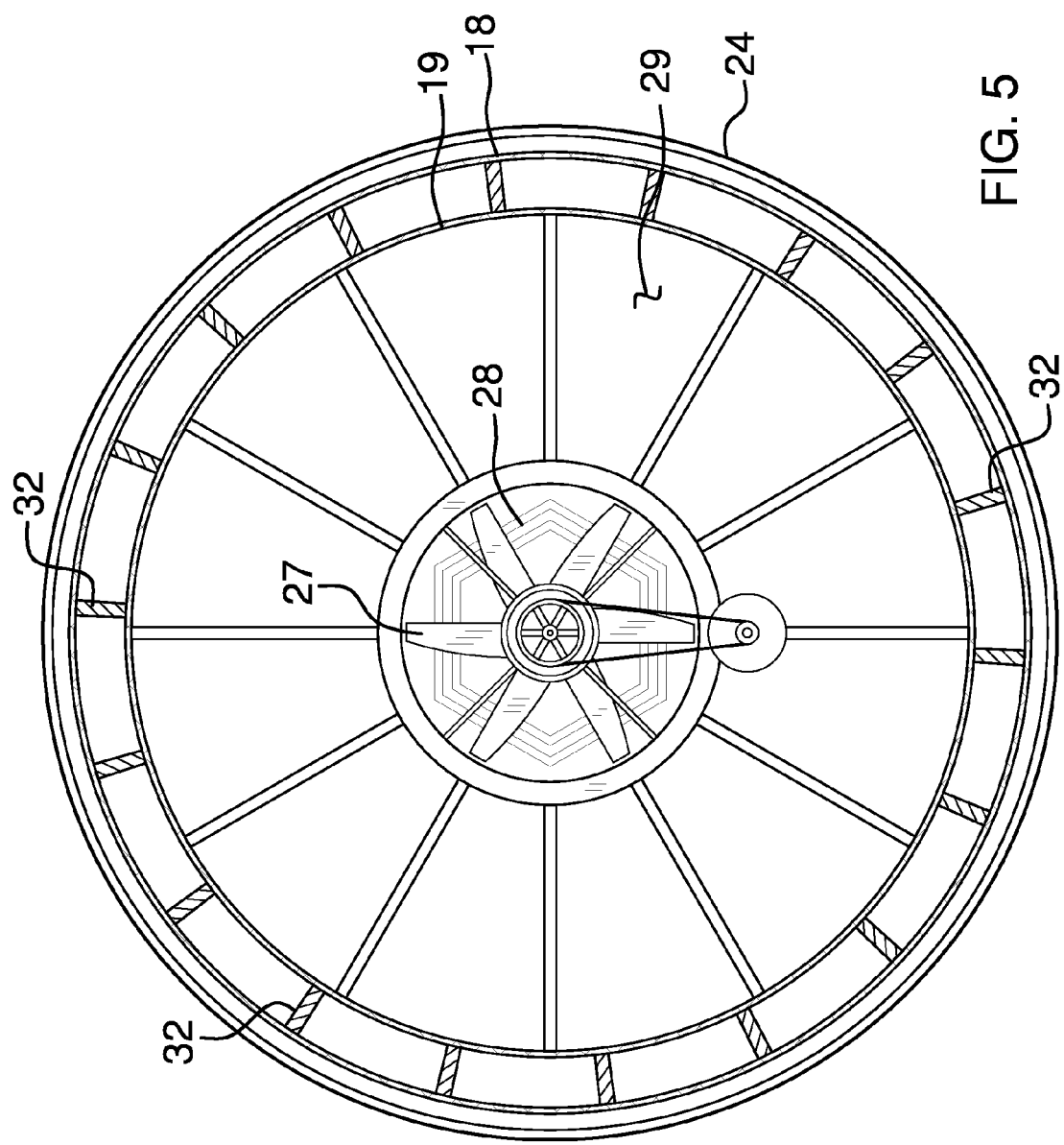
FIG. 5 is a cross-sectional taken along line 5-5 of FIG. 1 view of an embodiment of the disclosure.

With reference now to the drawings, and in particular to FIGS. 1 through 15 thereof, a new grain dryer embodying the principles and concepts of an embodiment of the disclosure and generally designated by the reference numeral 10 will be described.

As best illustrated in FIGS. 1 through 15, the grain drying apparatus 10 generally comprises an apparatus configured for receiving grain and drying the grain as the grain travels through the apparatus 10. The apparatus 10 further includes an agitator 40 for agitating the drying grain to prevent the grain from clumping as it leaves the apparatus 10.

More particularly, the apparatus 10 includes a housing 12 for receiving grain. The housing 12 further includes a bottom wall 14 and a plurality of supports 15 that are attached to and extend downwardly from the bottom wall 14 to support the bottom wall 14 above a ground surface. The bottom wall 14 may have an air inlet 16 extending therethrough that is positioned in a central area of the bottom wall 14. A louver 17 may be positioned over the air inlet 16 to control an amount of air pulled into the housing 12 through the air inlet 16. The housing 12 includes a double walled construction and in particular includes an outer wall 18 that is attached to and extends upwardly from the bottom wall 14 and an inner wall 19 that is positioned within the outer wall 18. The inner 19 and outer 18 walls form a tubular structure. Each of the outer 18 and inner 19 walls extend around an axis of the air inlet 16 and are likely spaced from the from the air inlet 16. The outer 18 and inner 19 walls are each air permeable, though the inner wall 19 may include a lower section, a middle section 20 and an upper section wherein each of the upper and lower sections each is air permeable and the middle section 20 is substantially solid for reasons enumerated below.

A top wall 21 is attached to and covers a top end of the inner wall 19. The top wall 21 is air permeable such that air flows through the top wall 21 while inhibiting the passage of grain through the top wall 21. The top wall 21 is angled downwardly from a central apex of the top wall to the inner wall 19. An upper wall 22 is attached to and covers an upper end of the outer wall 18. The upper wall 22 has a centrally located grain aperture 23 therein configured for receiving grain which is to be dried by the apparatus 10. The upper wall 22 is vertically spaced from the top wall 21. A jacket 24 is mounted on the housing 12 and extends around the outer wall 18. The jacket 24 is substantially solid and non-permeable to air. However, the jacket 24 may include venting apertures 25 for the purpose of stabilizing the apparatus 10 such as during high wind conditions. The jacket 24 is positioned above the bottom wall 14 and is spaced from the upper wall 22 to define an air outlet between the upper wall 22 and an upper edge of the jacket 24.

A heating assembly 26 is mounted within the housing 12. The heating assembly 26 draws air into the housing 12 through the air inlet 16 and the lower section of the inner wall 19 and a lower section of the outer wall 18 adjacent to the bottom wall 14. The air brought into the housing 12 is then heated and directed upwardly toward the top wall 21. This may be accomplished by the heating assembly 26 including a fan assembly 27 directed upwardly which directs air through a heating member 28 and toward the top wall 21. The heating assembly 26 is attached to the middle section 20 such that the heating assembly 26 is spaced above the lower section and below the top wall 21. A dividing wall 29 extends around the heating assembly 26 and between the heating assembly 26 and the inner wall 19 to divide the housing 12 such that a plenum is defined within the housing 12. For instance, an air pressure of an area below the heating assembly 26 is lower than an area above the heating assembly 26 when the heating assembly 26 is actuated to cause continuous circulation of air through the housing 12. The above is generally conventional with respect to known grain drying designs.

Figure 6:
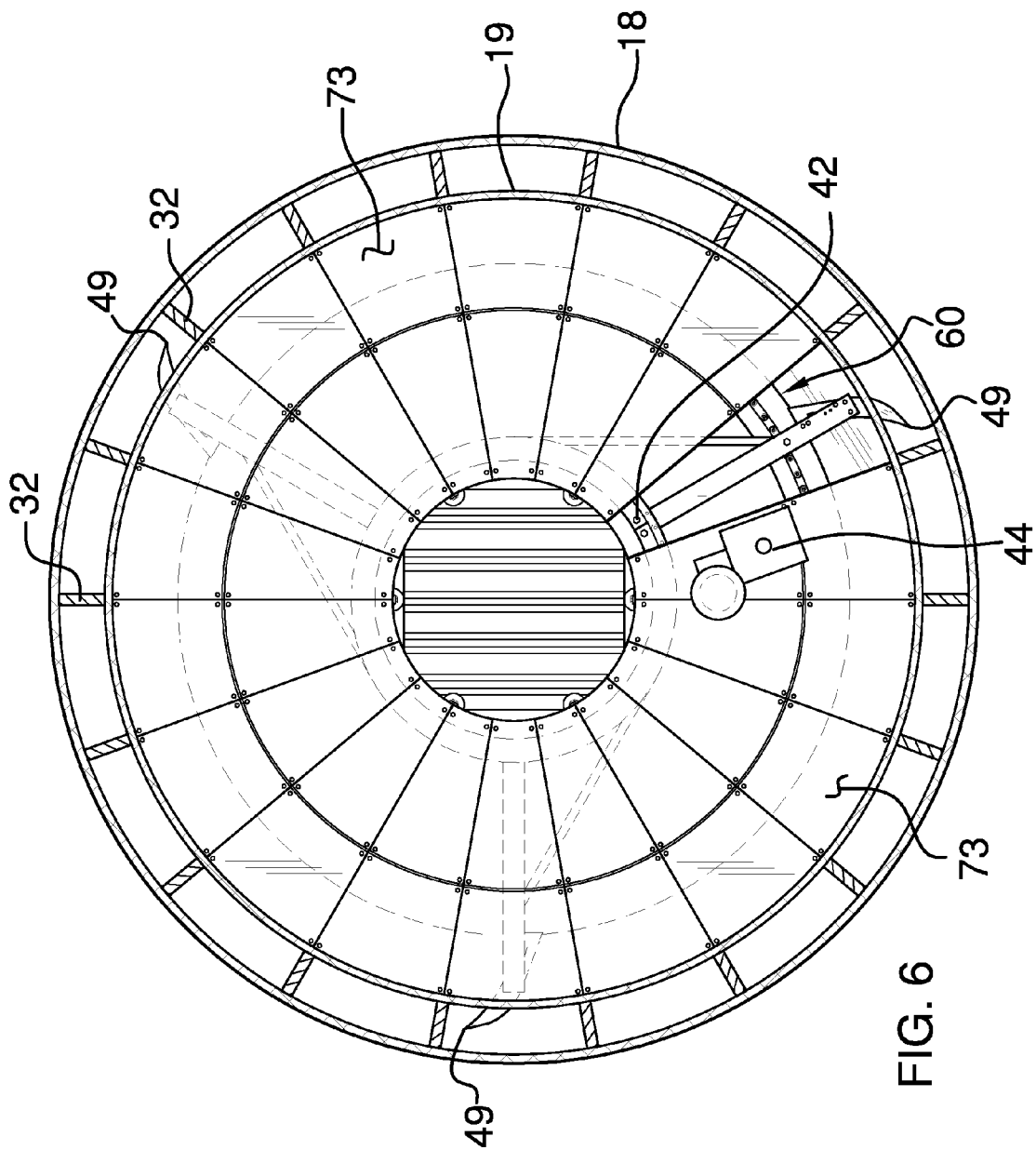
FIG. 6 is a cross-sectional view of an embodiment of the disclosure taken along line 6-6 of FIG. 1.

A receiving space 30 is defined between the inner 19 and outer 18 walls. The receiving space 30 is configured to receive grain which flows into the receiving space 30 from an upper end of the housing 12 through aperture 23. As shown in FIG. 6, vertically orientated interior walls 32 may extend between the inner 19 and outer 18 walls such that receiving space 30 is divided into distinct troughs and to provide rigidity between the inner 19 and outer 18 walls. The inner wall 19 has a bottom edge 34 which is spaced from the bottom wall 14 to define a release aperture 36 configured for allowing grain to flow outwardly from the receiving space 30 under the inner wall 19. The bottom wall 14 is substantially planar and horizontally orientated from the air inlet 16 to the outer wall 18.

The agitator 40 is mounted on the housing 12 and is positioned adjacent to the bottom wall 14. The agitator 40 extends under the inner wall 19 and through the release aperture 36 to agitate grain positioned in the receiving space 30 adjacent to the outer wall 18. In this manner, clumping of grain, which would otherwise prevent grain from flowing outwardly through and away from the release aperture 36, is broken up to ensure a steady flow of grain through the receiving space 30.

The agitator 40 includes a mount 41 that extends around and is rotatable with respect to a central area of the bottom wall 14. More particularly, the mount 41 may extend around the air inlet 16. The mount 41 is rotatable around the air inlet 41. In an embodiment of the mount 41, it may include a horizontally orientated cogwheel 42 which is engageable with a drive assembly 44 for rotating the cogwheel 42. The cogwheel 42 itself may be formed of a wheel having a chain 43 mounted perimeter edge such that the drive assembly engages the chain 43. Bearings 45, which may be comprised of horizontally orientated wheels, may be mounted in a wall between the mount 41 and the air inlet 16 so that the mount 41 abuts and is stabilized by the bearings 45.

A plurality of arms 48 is attached to and extends outwardly from the mount 41. The arms 48 are positioned over the bottom wall 14 and each of the arms 14 has a distal end 49 with respect to the mount 41. At least one of the distal ends 49 extends under the inner wall 19 and into the release aperture 36 and a plurality of the distal ends extends under the inner wall 19. It has been found that all of the distal ends 49 need not extend under the inner wall 19 for purposes of controlling grain flow. The plurality of arms 48, as shown in the Figures, may include three arms 48, though their precise number is dependent upon desired flow grain and therefore more or less than three arms may be utilized. Each arm 48 may further include one or more braces 50 being attached to and extending between the arm 48 and the mount 41 to prevent bending of the arms 48.

Each of the arms 48 may include a first section 51 attached to the mount 41 and a second section 52 including the distal end 49 wherein the first 51 and section 52 sections are adjustably coupled to each other to allow a distance between the distal end 49 and the outer wall 18 to be adjusted. Adjacent to their associated distal ends 49, the arms 48 each have a forward edge 53 and a rearward edge 54 wherein the forward edge 53 is concavely arcuate. The term "forward edge" is referring to the lead edge of the arms 48 when the mount 41 is being rotated. As can be seen from FIG. 3 in particular, the first 51 and second 52 sections may be coupled together by fasteners 56 extended through some of a plurality of openings 55 in the first section 51. This allows not only selective adjustment of the length of the arms 48, but also allows the orientation of the first 51 and second 52 sections with respect to each other to be altered. Thus, the forward edge 53 may be angled more or less forward of the first section 51 to allow for more or less aggressive engagement between the distal end 49 and the receiving space 36. The distal end 49 may be pointed as is shown in the Figures to further encourage insertion of the distal end 49 through clumping grain.

Figure 7:
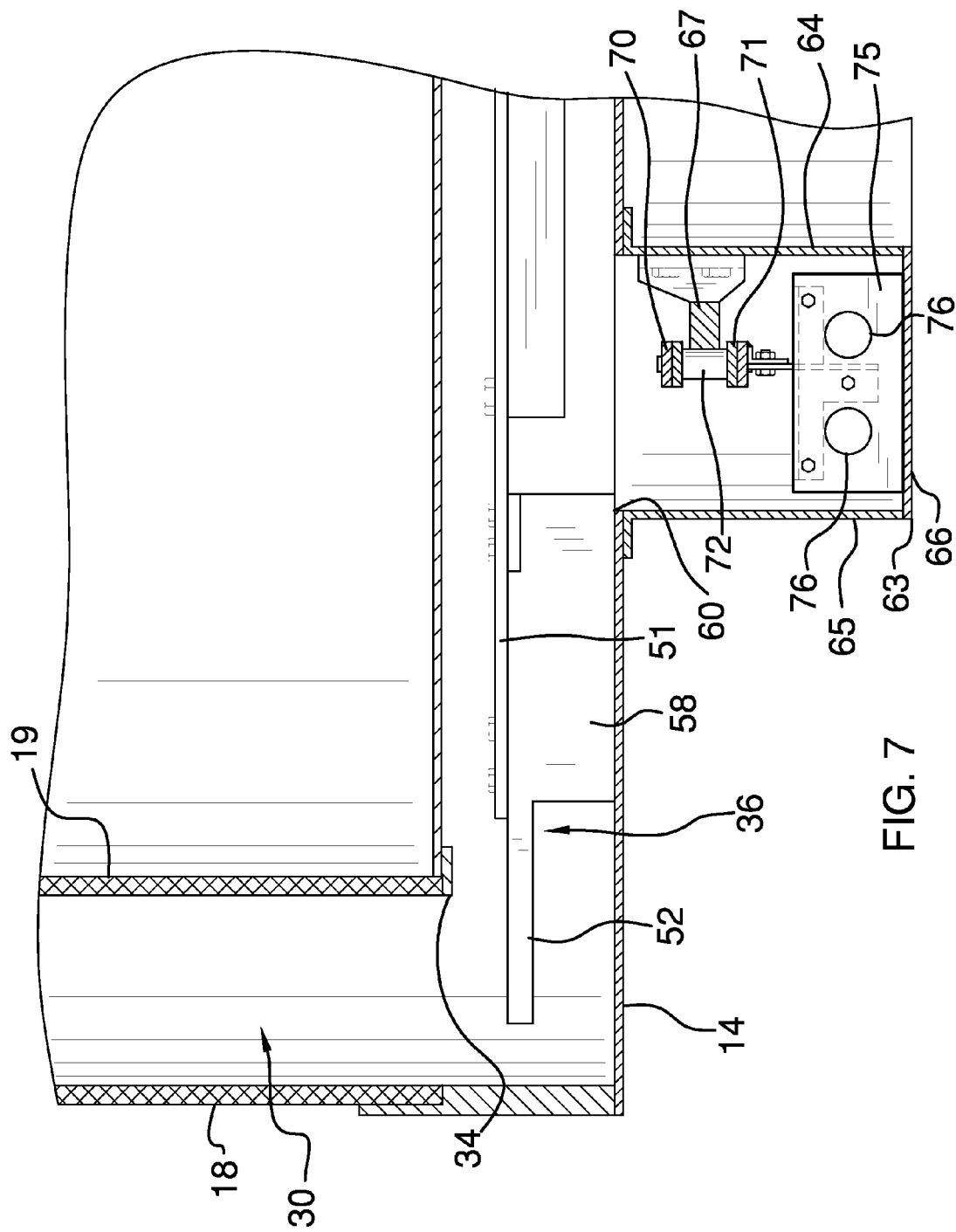
FIG. 7 is a cross-sectional view of an embodiment of the disclosure taken along line 7-7 of FIG. 3.
Figure 8:
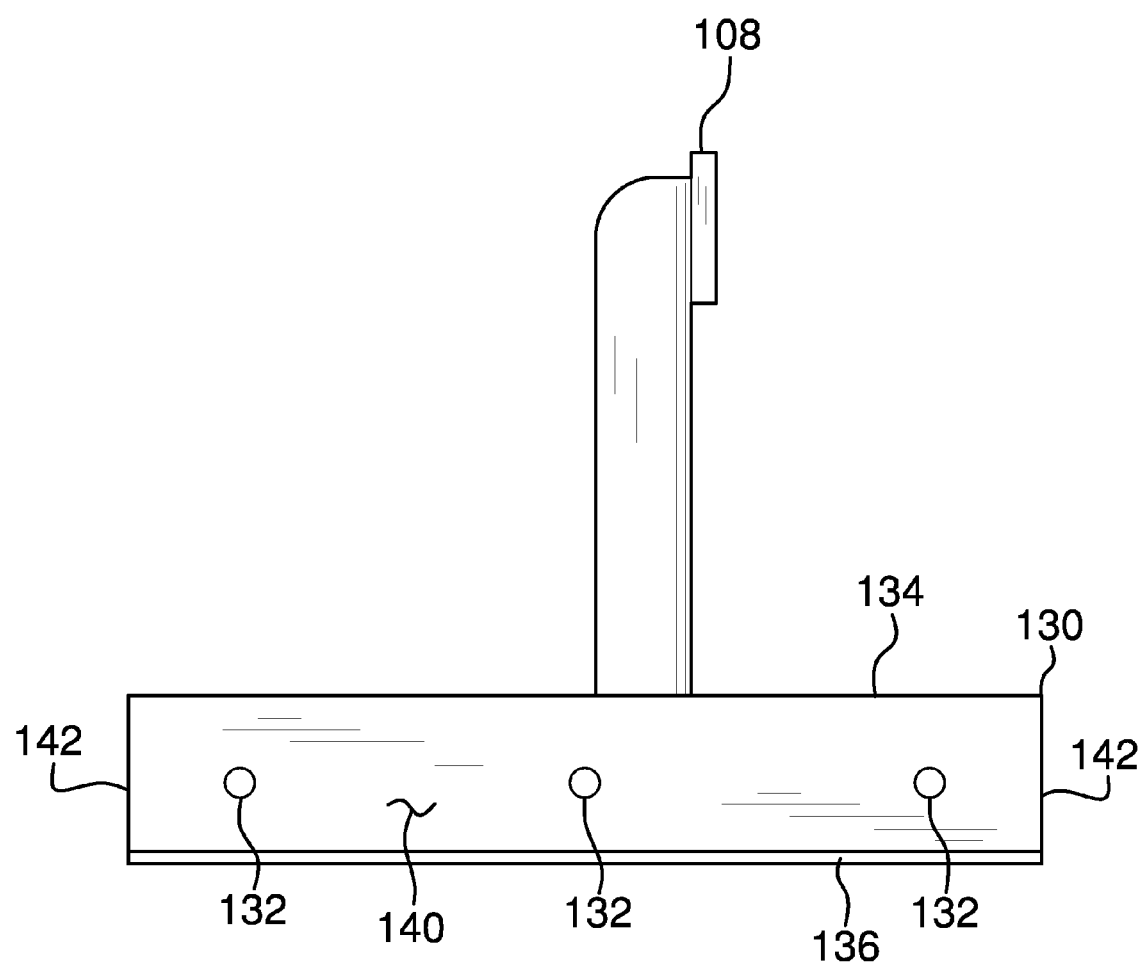
FIG. 8 is a front view of a paddle of an embodiment of the disclosure.
Figure 9:
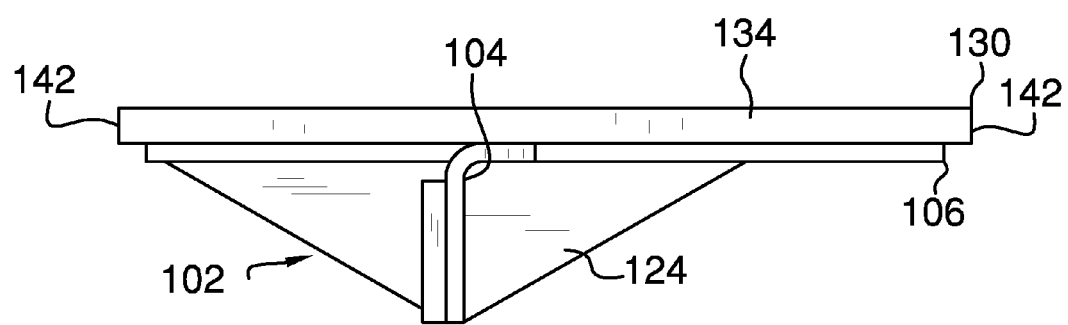
FIG. 9 is a top view of an embodiment of the disclosure shown in FIG. 8.
Figure 10:
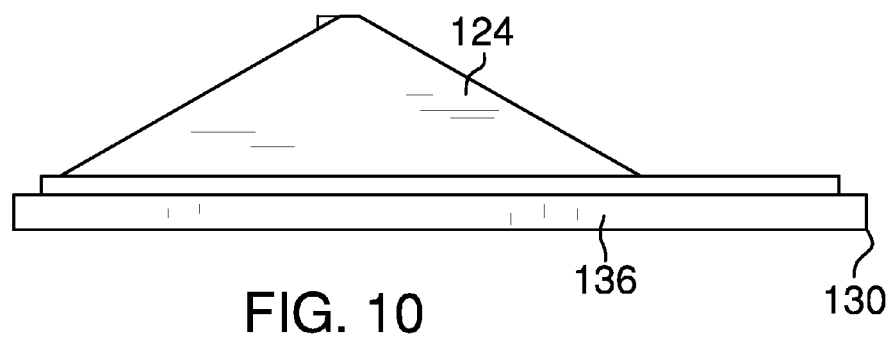
FIG. 10 is a bottom view of an embodiment of the disclosure shown in FIG. 8.
Figure 11:
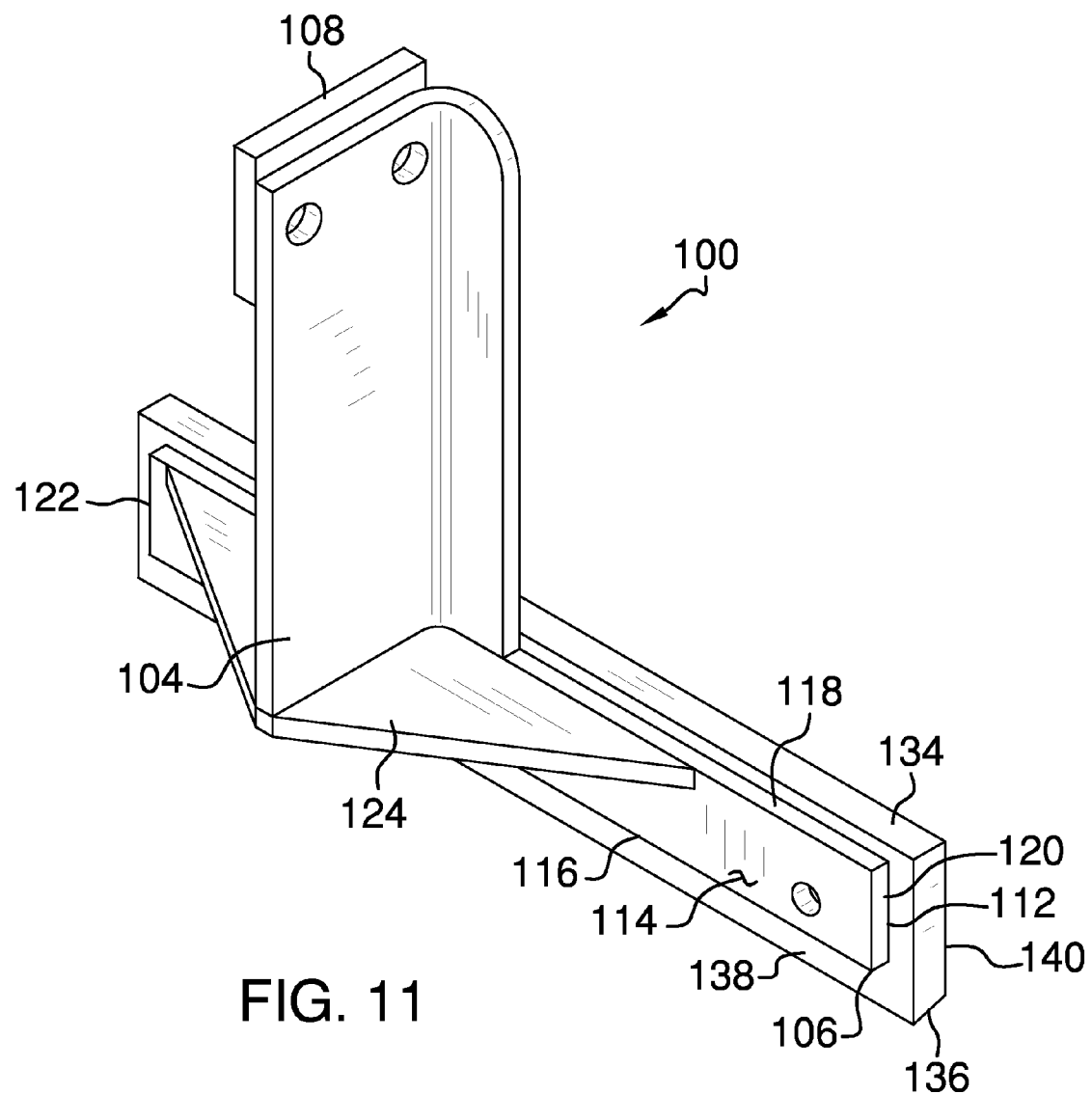
FIG. 11 is a rear perspective view of an embodiment of the disclosure shown in FIG. 8.
Figure 12:
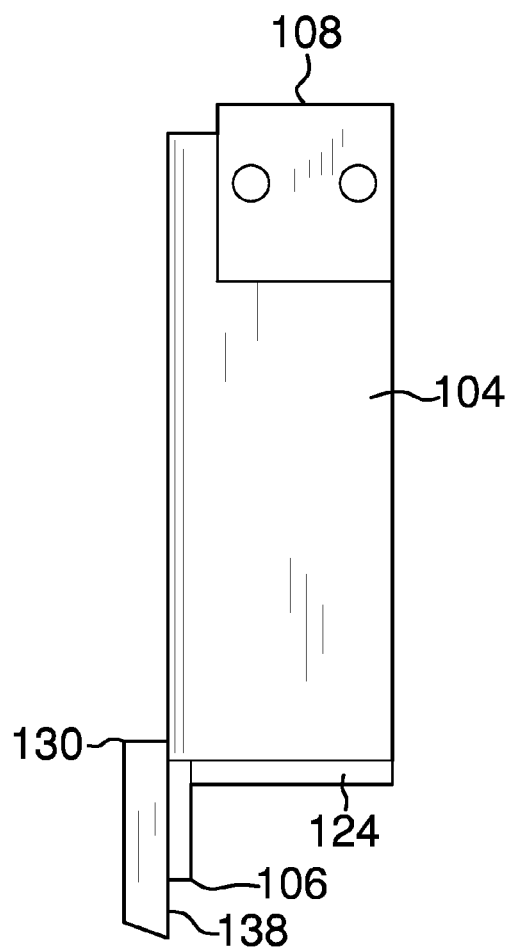
FIG. 12 is a right side view of an embodiment of the disclosure shown in FIG. 8.
Figure 13:
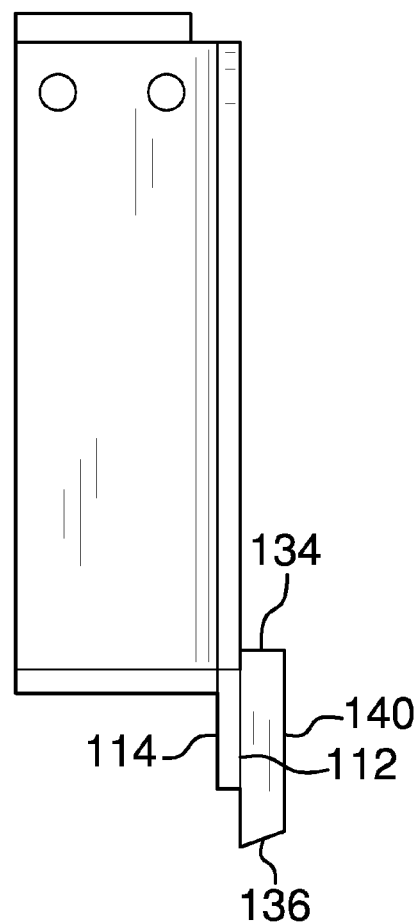
FIG. 13 is a left side view of an embodiment of the disclosure shown in FIG. 8.
Figure 14:
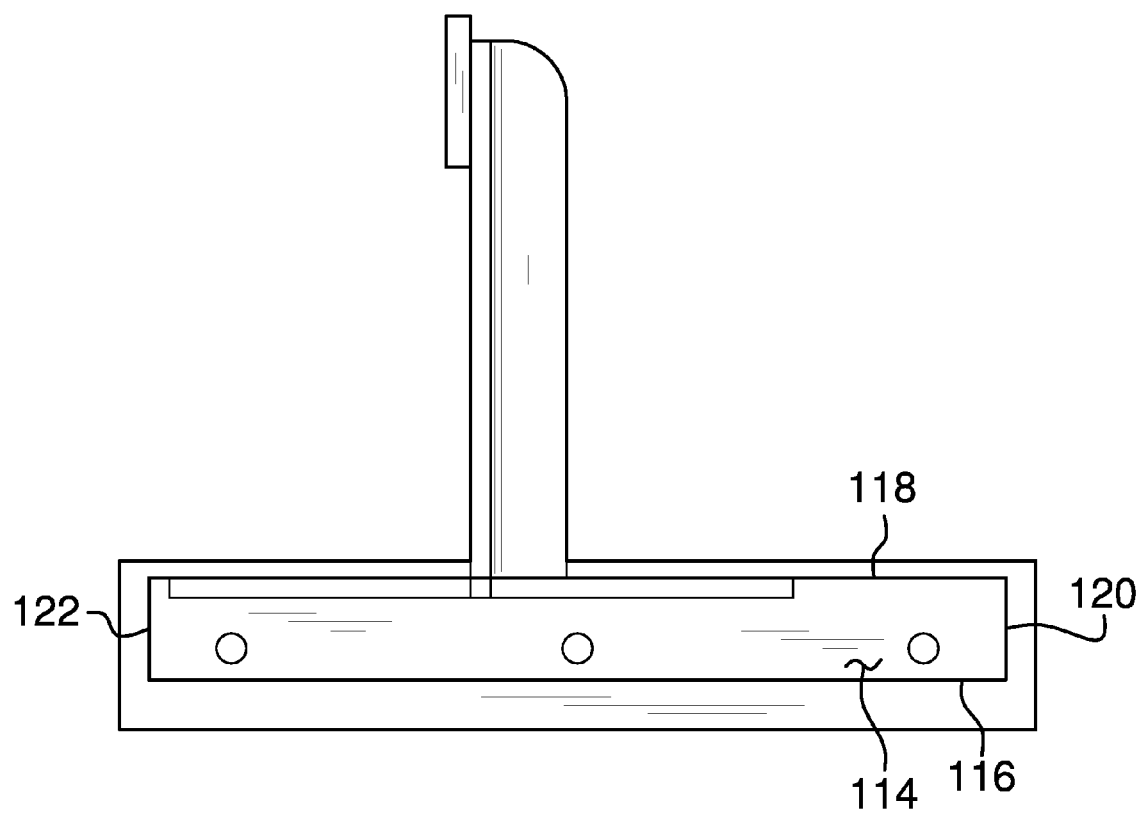
FIG. 14 is a rear view of an embodiment of the disclosure shown in FIG. 8.

A plurality of sweeps 58 is also provided. Each of the arms 48 has one of the sweeps 58 attached thereto. The sweeps 58 each extend downwardly from an associated one of the arms 48 and abut the bottom wall 14. More particularly, the sweeps 58 are attached to the second sections 52 of each of the arms 48 but are spaced from the corresponding distal ends 51 as is shown in FIG. 7. The sweeps 58 may be curved to match a curvature of the forward edges 53 and may extend into the release aperture 36.

For purposes of moving the grain outwardly of the apparatus 10, one of a plurality of conveyor systems may be used. However, one such conveyor system may include the bottom wall 14 having a channel 60 extending therethrough. The channel 60 extends around the air inlet 16 and the sweeps 58 extend from about the inner wall 19 and at least to the channel 60. The sweeps 58 may extend over the channel 60 to facilitate the movement of grain into the channel 60. As can be seen in FIG. 6, panels 73 may be positioned over the agitator 40 and channel 60. FIG. 6 depicts one of the panels 73 being removed. A conveyor assembly 62 is in communication with the channel 60. The conveyor assembly 62 is configured to receive and transport grain away from the housing 12. The conveyor assembly 62 includes a conduit 63 that is attached to the bottom wall 14. The conduit 63 is coextensive with the channel 60 and includes a first lateral wall 64, a second lateral wall 65 and a lower wall 66 attached to and extending between the first 64 and second 65 lateral walls. A rail 67 is attached to the conduit 63 and may be mounted on the first lateral wall 64. A chain 68 is mounted on the rail 67. The chain 68 forms a continuous loop and includes a plurality of links 69. Each of the links 69 includes an upper plate 70 and lower plate 71 wherein the upper 70 and lower 71 plates are each horizontally orientated. The links 69 each further include a roller 72 that is attached to and extends between associated ones of the upper 70 and lower 71 plates. The roller 72 has a vertically orientated axis and abuts the rail 67. This configuration allows the rail 67 to take any one of a plurality of courses while allowing the lower plate 71 of each link 69 remain horizontally orientated.

Each of a plurality of paddles 75 is attached to and extends downwardly from the chain 68. The paddles 75 each extend between the first 64 and second 65 lateral walls when the paddles 75 are within the conduit 63. The paddles 75 may or may not abut the first 64 and second 65 lateral walls, however the paddles 75 are typically orientated perpendicular to the first 64 and second 65 lateral walls or within 5° of being perpendicular to the first 64 and second 65 lateral walls. The paddles 75 may abut the lower wall 66 when the paddles 75 are in the conduit 63. Each of the paddles 75 may further have one or more openings 76 extending therethrough. The openings 76 ensure that the grain is more evenly distributed within the conduit 63.

Figure 15:
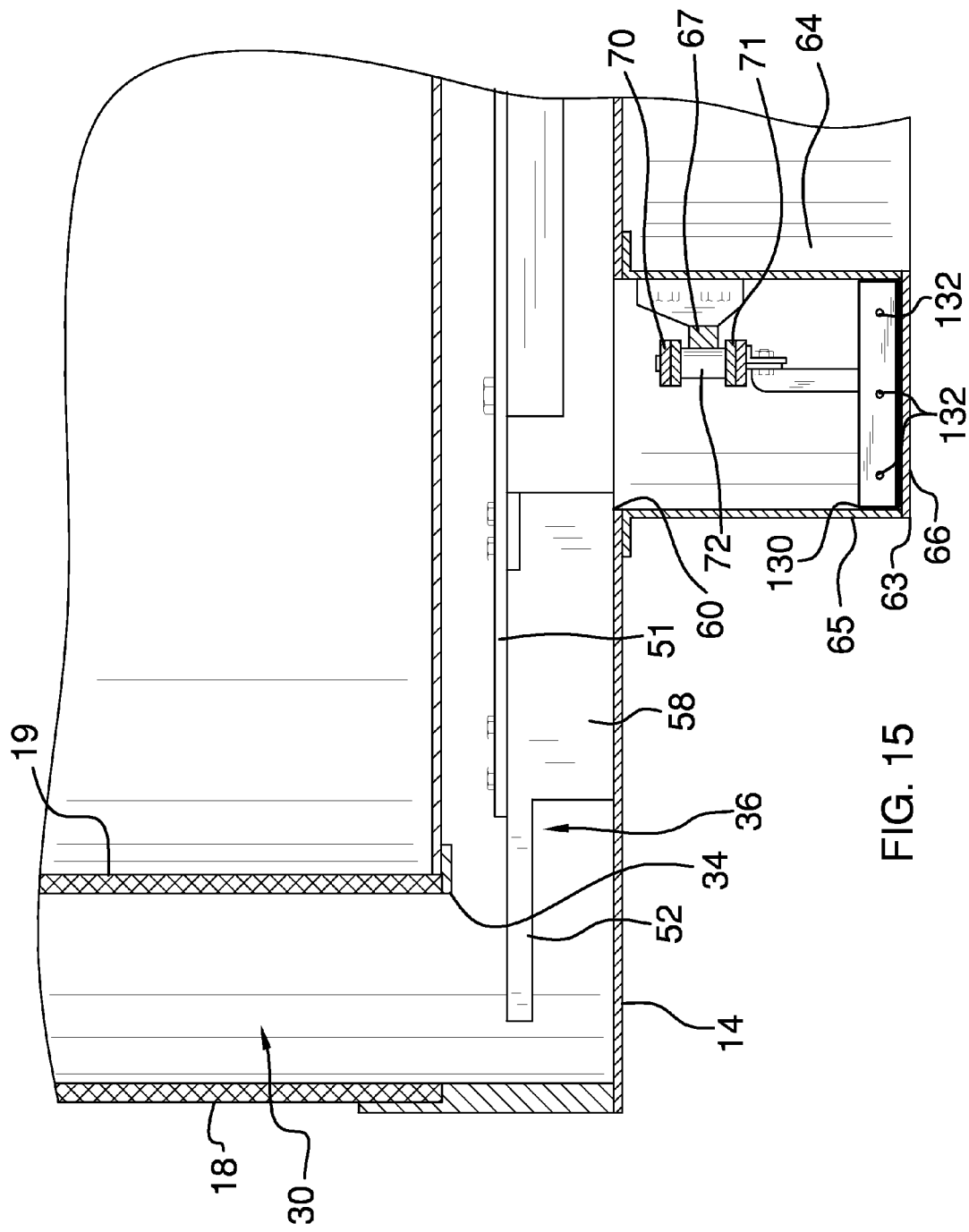
FIG. 15 is a front in-use view of an embodiment of the disclosure shown in FIG. 8.

FIGS. 8-15 show an embodiment of a conveyor assembly 62 configured to be in communication with the channel 60 and which is configured to receive and transport grain away from the housing 12. The conveyor assembly 62 includes paddles 100 each having a mount 102 with a vertical section 104 and a horizontal section 106. The vertical section 104 includes an upper end 108 and the vertical section 104 is attached to the chain 68 adjacent to the upper end 108. This may be accomplished with a bracket 110 attached to the lower plate 71 as shown in FIG. 15. The horizontal section 106 is spaced from the upper end 108. The horizontal section 106 has a front surface 112, a rear surface 114, a lower edge 116, a top edge 118, a first lateral edge 120 and a second lateral edge 122. The vertical section 104 extends rearward of the horizontal section 106 and a brace 124 is attached to each of the vertical 104 and horizontal 106 sections to inhibit their twisting relative to each other.

A blade 130 is attached to the front side 112 and extends laterally away from the first 120 and second 122 lateral edges. The blade 130 may extend upwardly above the top edge 118 and downwardly below the lower edge 116 as well. The blade 130 is comprised of a substantially rigid material such as a plastic, elastomer or the like. Metallic materials may also be employed. The at least one opening 132 extends through each of the blade 130 and the horizontal section 106. As can be seen in the Figures, the at least one opening 132 may include three openings 132 laterally spaced from each other. The openings 132 are annular and each has a diameter less than 0.50 inches and greater than 0.25 inches. The openings 132 are positioned greater than 2.25 inches from each other.

More particularly, the blade 130 may include an uppermost edge 134 and a lowermost edge 136 wherein the openings 132 are equally spaced from the uppermost 134 and lowermost 136 edges. Furthermore, the lowermost edge 136 may be angled upwardly from a back side 138 to a front side 140 of the blade. An angle formed at a juncture of the lowermost edge 136 and the front side 140 is between 95° and 105° and more particularly equal to approximately 100°. While the size of the blade 130 may be altered depending on the size of the conduit 63, the blade 130 may have a length between opposed lateral edges 142 equal to between 9.0 inches and 9.25 inches and a height between 1.60 inches and 1.75 inches. A distance from an uppermost edge 134 of the blade 130 to the upper end 108 of the vertical section 104 is greater than 4.75 inches.

A chute 77 is attached to and extends laterally away from the conduit 63. The chute 77 includes an outward portion 78 and a return portion 79 with a dividing wall 80 positioned between the outward 78 and return 79 portions. The chute 77 has an outer end 81 positioned distal to the conduit 63. A drive gear 83, driven by a motor 85, is mounted in the chute 77 adjacent to the outer end 81 and the chain 68 is engaged by the driving gear 83. The chain 68 is moved through the conduit 63 and the chute 77 when the motor 85 is turned on. In this manner, the chain 68 travels outwardly from the conduit 63 along the outward portion 78 and returns to the conduit 63 through the return portion 79. Tension arms 87 are mounted in the conduit 63 at the juncture of the chute 77 and the conduit 63 and include rotatable gears 88 for engaging and retaining tension on the chain 68. The chute 77 has a dump aperture 90 therein positioned adjacent to the outer end 81 for releasing grain from the chute 77 so that it may be carried away by conventional transporting means 92, such as a conveyor belt or auger, for storage and future use.

In use, the heating assembly 26 is turned on and grain is unloaded into the housing 12 so that the grain pours into the receiving space 30 and outwardly of the release aperture 36. Generally, air is brought into the housing 12 through the inner 19 and outer 18 walls adjacent to the bottom wall 14 and through the air inlet 16. It is heated and then travels through the inner wall 19 and outer 18 walls above the heating assembly 26, as well as the top wall 21, so that the grain is heated and dried. As the grain moves to a position vertically below the heating assembly 26, air brought into the housing 12 through the inner 19 and outer 18 walls cools the grain to a suitable temperature for storage. In general, gravity will cause the grain to flow outwardly through the release aperture 36 and toward the channel 60, however, clumping grain will prevent the grain from moving away from the outer wall 18. The agitator 40 will not only facilitate grain moving toward the channel 60 but will ensure that clumps of grain will not clog the release aperture 36 and prevent efficient movement of grain toward the channel 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A grain moving apparatus including for moving grain from a grain dryer apparatus, said grain moving apparatus being attached to a bottom wall of a housing of a grain moving apparatus and being in fluid communication with a channel in the bottom wall for receiving grain from the grain dryer apparatus, said grain dryer moving apparatus including:
    a conveyor assembly being configured to be in communication with the channel, said conveyor assembly being configured to receive and transport grain away from the housing, said conveyor assembly including:

a conduit being attachable to said bottom wall and being coextensive with the channel, said conduit including a first lateral wall, a second lateral wall and a lower wall attached to and extending between said first and second lateral walls;

a rail being attached to said conduit;

a chain being mounted on said rail, said chain forming a continuous loop, said chain including a plurality of links each including an upper plate and a lower plate, each of said upper and lower plates being horizontally orientated, said chain lying in a horizontal plane; and a plurality of paddles being attached to and extending downwardly from said chain, said paddles each extending between said first and second lateral walls when said paddles are within said conduit.

2. The grain moving apparatus according to claim 1, wherein said paddles abut said lower wall when said paddles are in said conduit.

3. The grain moving apparatus according to claim 1, wherein each of said paddles includes has at least one opening extending therethrough to facilitate even distribution of grain in said conduit.

4. The grain moving apparatus according to claim 1, wherein each of said paddles includes:

a mount including a vertical section and a horizontal section, said vertical section including an upper end, said vertical section being attached to said chain adjacent to said upper end, said horizontal section being spaced from said upper end, said horizontal section having a front surface, a rear surface, a lower edge, a top edge, a first lateral edge and a second lateral edge; and a blade being attached to said front side, said blade extending laterally away from said first and second lateral edges, said blade extending upwardly above said top edge and downwardly below said lower edge, said at least one opening extending through each of said blade and said horizontal section.

5. The grain moving apparatus according to claim 4, wherein said at least one opening includes three openings laterally spaced from each other.

6. The grain moving apparatus according to claim 5, wherein each of said openings is annular and has a diameter less than 0.50 inches.

7. The grain moving apparatus according to claim 6, wherein said openings are positioned greater than 2.25 inches from each other.

8. The grain moving apparatus according to claim 7, wherein said blade includes an uppermost edge and a lowermost edge, said openings being equally spaced from said uppermost and lowermost edges.

9. The grain moving apparatus according to claim 5, wherein said blade includes an uppermost edge and a lowermost edge, said openings being equally spaced from said uppermost and lowermost edges.

10. The grain moving apparatus according to claim 9, wherein said lowermost edge is angled upwardly from a back side to a front side of said blade.

11. The grain moving apparatus according to claim 5, wherein said blade has a length between opposed lateral edges being equal to between 9.0 inches and 9.25 inches and a height between 1.60 inches and 1.75 inches.

12. The grain moving apparatus according to claim 11, wherein a distance from an uppermost edge of said blade to said upper end of said vertical section is greater than 4.75 inches.

13. A grain dryer and moving apparatus combination including:

a housing for receiving grain, said housing including a bottom wall, an outer wall being attached to and extending upwardly from said bottom wall and an inner wall being positioned within said outer wall, a receiving space being defined between said inner and outer walls and being configured to receive grain, said inner wall having a bottom edge spaced from said bottom wall to define a release aperture configured for allowing grain to flow outwardly from said receiving space under said inner wall and onto said bottom wall;

a heating assembly being mounted within said housing;

an agitator being positioned adjacent to said bottom wall to agitate grain positioned in said receiving space adjacent to said outer wall;

said bottom wall having a channel extending therethrough configured for receiving grain; and a conveyor assembly being in communication with said channel, said conveyor assembly being configured to receive and transport grain away from said housing, said conveyor assembly including:

a conduit attached to said bottom wall and being coextensive with said channel, said conduit including a first lateral wall, a second lateral wall and a lower wall attached to and extending between said first and second lateral walls;

a rail being attached to said conduit;

a chain being mounted on said rail, said chain forming a continuous loop, said chain including a plurality of links each including an upper plate and a lower plate, each of said upper and lower plates being horizontally orientated; and a plurality of paddles being attached to and extending downwardly from said chain, said paddles each extending between said first and second lateral walls when said paddles are within said conduit.

14. The grain dryer and moving apparatus combination according to claim 13, wherein said paddles abut said lower wall when said paddles are in said conduit.

15. The grain dryer and moving apparatus combination according to claim 13, wherein each of said paddles includes has at least one opening extending therethrough to facilitate even distribution of grain in said conduit.

16. The grain dryer and moving apparatus combination according to claim 13, wherein each of said paddles includes:

a mount including a vertical section and a horizontal section, said vertical section including an upper end, said vertical section being attached to said chain adjacent to said upper end, said horizontal section being spaced from said upper end, said horizontal section having a front surface, a rear surface, a lower edge, a top edge, a first lateral edge and a second lateral edge; and a blade being attached to said front side, said blade extending laterally away from said first and second lateral edges, said blade extending upwardly above said top edge and downwardly below said lower edge, said at least one opening extending through each of said blade and said horizontal section.

17. The grain dryer and moving apparatus combination according to claim 16, wherein said at least one opening includes three openings laterally spaced from each other.

18. The grain dryer and moving apparatus combination according to claim 17, wherein said blade includes an uppermost edge and a lowermost edge, said openings being equally spaced from said uppermost and lowermost edges.

19. The grain dryer and moving apparatus combination according to claim 16, wherein a lowermost edge of said panel is angled upwardly from a back side to a front side of said blade.

20. The grain dryer and moving apparatus combination according to claim 16, wherein said blade has a length between opposed lateral edges being equal to between 9.0 inches and 9.25 inches and a height between 1.60 inches and 1.75 inches, a distance from an uppermost edge of said blade to said upper end of said vertical section is greater than 4.75 inches.

* * * * *